United States Patent Office 3,382,372
Patented May 7, 1968

3,382,372
PROTECTIVE APPARATUS
Roy Hutchins and John Edmund Robson, Leicester, England, assignors to Associated Electrical Industries Limited, London, England, a British company
Filed Jan. 27, 1964, Ser. No. 340,342
Claims priority, application Great Britain, Jan. 29, 1963, 3,657/63
2 Claims. (Cl. 307—88)

ABSTRACT OF THE DISCLOSURE

A laddic is provided with an input winding at one end of the laddic and an output winding at the other end thereof and intermediate control windings on rungs between the two windings. A reset winding is provided which in the preferred form is about the laddic solely between the last control winding and the output winding.

---

This invention relates to magnetic devices and more particularly to devices termed laddics.

A laddic is a device comprising a ferrite magnetic core in the form of a magnetic network having an input limb carrying a set winding and magnetically in series with an output limb carrying an output winding, together with a number of by-pass limbs certain ones of which carry control windings and are so arranged that after resetting, provided all the control windings are energised, a signal applied to the set winding can produce a signal in the output winding but absence of any control signal will prevent or reduce a signal appearing in the output winding.

It has been proposed to construct laddics in the form of a ladder with a set winding on one end rung and output winding on the opposite end rung and an even number of intermediate rungs forming the by-pass limbs and with control windings on the even numbered rungs, i.e. counting from the input rung and excluding the output rung. Laddics may be employed for example in protective systems in which set signals alternate with reset signals and produce corresponding output signals but if any one of the control windings on the intervening limbs is not energised due to a fault in the equipment, then the output limb is by-passed magnetically and the absence of output signals indicates that there is a fault. Laddics may also be employed in logic circuits for example as AND gates.

To maintain an output signal when the control windings are excited, the M.M.F. produced by each control winding, when excited, must be sufficient to oppose the M.M.F. due to the set winding in the limb concerned but the rung carrying a control winding must provide a ready path for the flux due to the set winding if the control winding is not excited.

In laddics as proposed hitherto the reset windings have been shown distributed along the laddic and arranged around the limbs adjacent the odd numbered windows, i.e. counting from the set winding end, so that they tend to produce M.M.F.'s in the rungs carrying control windings which are in the same directions as the M.M.F.'s due to the control windings themselves.

The term window as employed herein implies an aperture between an adjacent pair of rungs.

There is always the risk of a short circuit in a control winding, i.e. of one or more turns forming a closed short circuited loop. As is well known this would tend to oppose any change of flux; thus the collapse of the flux due to the control winding would be delayed and moreover, any fall in flux may well be restored, at least partially, by the M.M.F.'s due to the reset windings.

Since under normal operation set and reset signals would be applied alternately the response due to a cutting off of a control signal may be delayed and output signals continue for a period of time.

In the case of protective apparatus in which rapid response is essential this may be extremely serious and the main object of the invention is to provide an improved arrangement for avoiding this.

According to the present invention a laddic has at least the major part of the reset windings arranged on the output side of the last rung carrying a control winding and at least part of the reset winding arranged on the output rung or the side limbs adjacent thereto.

According to one embodiment the whole of the reset winding is arranged on the rung and/or side limbs bordering the output end window.

According to another embodiment a relatively small reset winding is arranged on the rung and/or side limbs bordering the output end window and a relatively large reset winding on the side arms of the second window from the output end. With such an arrangement a third relatively small reset winding may be arranged on the side limbs bordering the third window from the output end.

With such arrangement of reset windings it is found that a short circuit on a control winding instead of impairing its effectiveness tends to increase its effectiveness and according to a further embodiment short circuited windings are provided on one or more of the rungs carrying a control winding.

Preferably there is a short circuited winding on each rung carrying a control winding.

The short circuited winding or windings may each comprise one or more turns and may be directly short circuited or short circuited through resistance.

Such a short circuited winding permits a smaller control winding and/or control signal to be employed for the same effectiveness.

With such arrangements the control windings should be continuously energised under healthy conditions.

In order that the invention may be more clearly understood reference will now be made to the accompanying drawings, in which.

Figure 2:
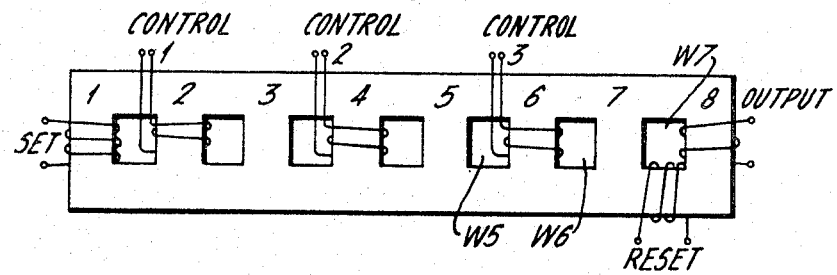
FIG. 2 shows a laddic of the kind shown in FIG. 1 in which the reset winding is arranged in accordance with the present invention.
Figure 3:
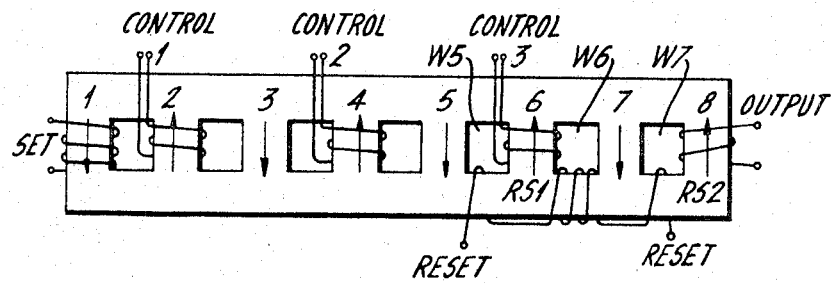
FIGS. 3 and 4 show modified arrangements of the reset winding as shown in FIG. 2.
Figure 4:
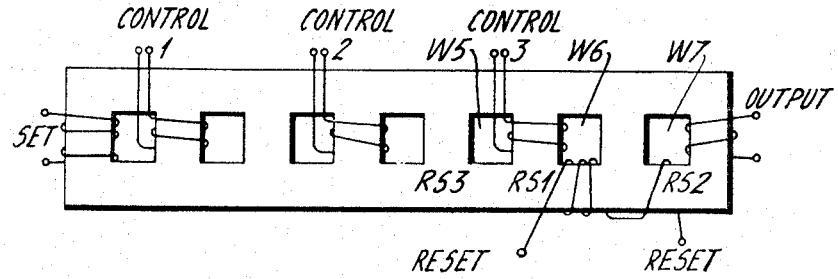
Figure 5:
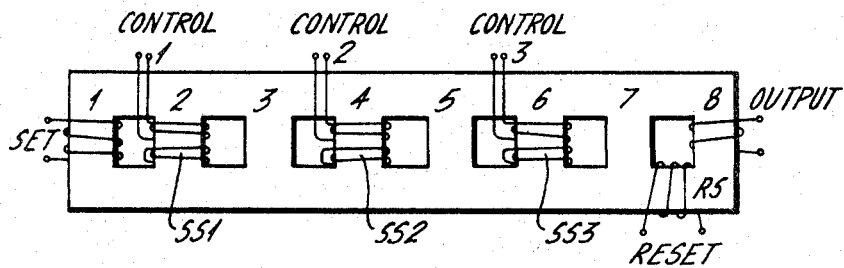
Figure 6:
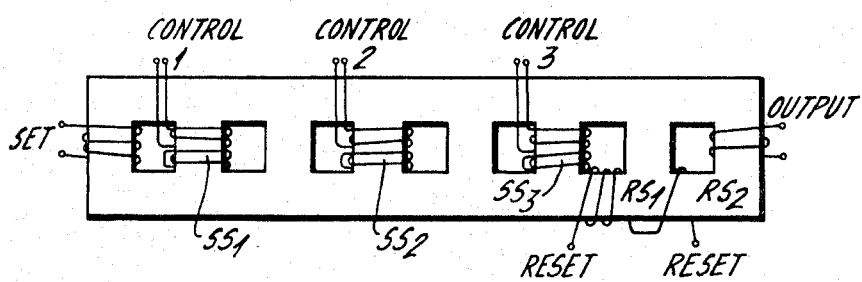
Figure 7:
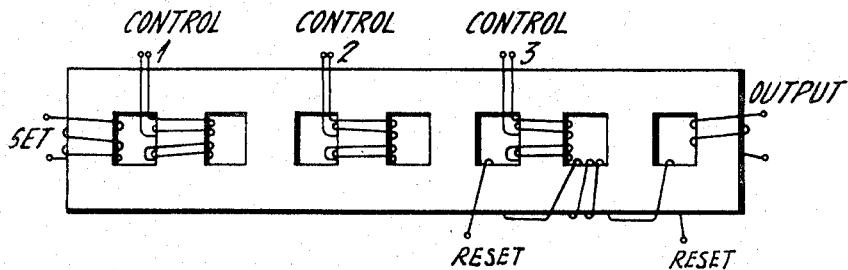

FIGS. 5, 6 and 7 correspond to FIGS. 2, 3 and 4 respectively but employ additional short circuited windings on the rungs carrying the control windings.

Figure 1:
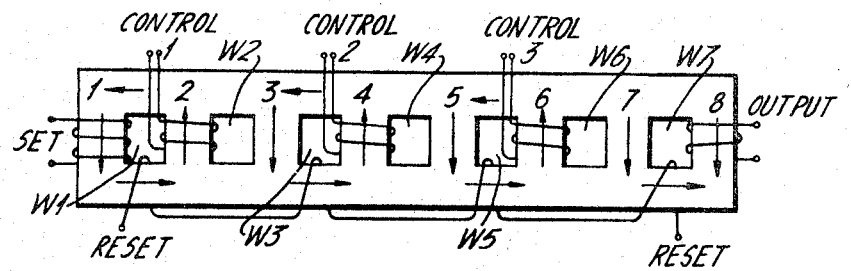
FIG. 1 shows a previously proposed form of laddic.

Referring first to FIG. 1, it will be seen that the form of laddic hitherto proposed is in the nature of a ferrite ladder having side limbs and cross rungs spaced apart along the side limbs. In the actual arrangement shown there are eight rungs though clearly this is by way of example only. Normally however there would be an even number of rungs (including the end rungs). There is a set winding on the first rung and an output winding on the eighth, i.e. the last, rung. Control windings are arranged on the intermediate rungs 2, 4 and 6 and reset windings are arranged on the side limbs bordering the windows W1, W3, W5 and W6.

It is found that with such an arrrangement provided signals are applied to the control windings, a signal applied to the set winding and following a reset signal will produce a signal in the output winding. If, however, any one of the control windings is de-energised when the input signal is applied, then no signal will be produced at the output and this may be used for instance, to provide an indication of the absence of a control signal.

The exact theory of operation is somewhat complicated but it is thought that the following may be regarded as a simplified explanation for purposes of understanding the invention.

It appears that the combined actions of the control and reset windings produce residual fluxes in the directions shown by the arrows, that is to say, upwards in the even numbered rungs and downwards in the odd numbered rungs. Assume also that the control windings produce M.M.F.'s in the rungs acting in the same directions as the residual fluxes indicated by the arrows. If now a set signal of the appropriate strength is applied to the set winding so as to tend to reverse the residual flux in rung 1, it will not be able to complete its magnetic circuit through rung 2 as it will be opposed by the M.M.F. due to the control winding 1. Similar remarks apply to rungs 4 and 6. Rung 3 will be magnetised in the downward direction, i.e. in the same direction as the M.M.F. due to the set signal, and as it will be saturated or nearly saturated, it will appear as a path of high reluctance. Similar remarks apply to rungs 5 and 7. It follows, therefore, that the only available path is through rung 8 so that an output signal will be produced. If, however, any of the control signals is absent, for instance control signal 1, then the flux due to the input signal would be able to pass through rung 2 which in the absence of the M.M.F. due to the control signal will offer a path of low reluctance and will by-pass rung 6.

It follows, therefore, that if any one of the control signals is absent the output limb will be by-passed and no output signal will be produced.

This of course assumes that the control windings are properly effective. If, on the contrary, a short circuit should develop in one of them it follows that there will be a short circuited turn which will, as is well known, oppose any change in flux and will therefore tend to oppose the dying away of the flux in the event that a control winding becomes de-energised.

With the arrangement of the reset windings shown in FIG. 1, these windings will tend to produce M.M.F.'s as shown by the arrows and it can be seen that in the rungs carrying control windings the M.M.F.'s due to the reset windings will be in the same direction as the M.M.F.s due to the control windings.

If, therefore, a control winding having a short circuited turn should become de-energised the short circuited turn will delay the decay of the control winding flux and in addition the M.M.F. due to the reset winding will tend to restore this flux; the net result is that the combined action of these two factors may in some cases maintain the flux indefinitely and in others may delay it unduly over a period during which signals will continue to be produced in the output winding. In the case of a protective circuit this may be a serious matter as it will mean that in fault conditions the response is much too slow.

FIGS. 2, 3 and 4 show respectively three arrangements of reset windings designed to avoid this difficulty. In FIG. 2 the whole of the reset winding RS is arranged around the last window, i.e. W7. Clearly the winding may be arranged either on the side limbs or on the end rung, i.e. rung 8, or partly on the rung and partly on the side limbs. With such an arrangement the reset winding will produce an M.M.F. acting around the path formed by the end rungs and the full lengths of the side limbs and it follows, therefore, that in the case of a short circuit arising in one of the control windings the M.M.F. due to the reset winding will not tend to act along the rung in a manner sufficiently to sustain the control winding flux.

FIG. 3 shows a modified arrangement in which the main reset winding RS1 is on the limbs around the second window from the output end, i.e. around W6. In this case there is a small reset winding RS2 on the limb around W7: the purpose of this is to produce a counter M.M.F. in rung 7 which combined with that due to control winding 3, will prevent the M.M.F. due to the main section RS1 of the reset winding acting through the rung 7 and thereby compel it to act along the rung 8.

FIG. 4 shows a further modification which is the same as that of FIG. 3 excepting that there is a third small reset winding RS3 on the limb around the window W5. This has been found to improve the action of reset but the winding RS3 must of course only produce a small M.M.F. otherwise in the case of a short circuit occurring in a control winding 3 it will tend to maintain the control winding flux as above explained.

Other small reset windings may be arranged on the side limbs towards the set winding end provided the above conditions are complied with.

It has been found that with such an arrangement the difficulties due to a short circuit can be eliminated or at least reduced to a negligible proportion. Furthermore, it has been found that with the improved arrangement of reset winding there is some advantage in having a short circuited turn in the control winding as it enables the control winding to be made smaller. As above explained, the set winding is only excited for short periods of time and the control winding must be sufficient to prevent the M.M.F. due to the set winding from changing the flux in the rung concerned. It follows, therefore, that a short circuited turn will also tend to reduce the rate of change of flux and this permits the control winding to be made smaller since a slight reduction in the flux produced by the set pulse will be restored in the period between the pulses assuming of course that the control winding is continuously energised. If, on the other hand, the control winding is not energised then the flux will be progressively reduced to zero and whilst this may take a few cycles, for most purposes the response will be sufficiently rapid and of course will be quite distinguishable from cases above cited in which the fall in flux tends to be restored by the reset M.M.F.

It is of course understood that in arrangements employing a short circuited winding the control windings are, under healthy conditions, excited continuously.

FIGS. 5, 6 and 7 show embodiments in which short circuited windings SS1, SS2 and SS3 are arranged on the even rungs carrying the control windings 1, 2 and 3 respectively and in such cases these control windings may be reduced in size and this may be a great advantage in cases where the winding space is limited.

What we claim is:

1. A laddic magnetic device comprising a ferrite magnetic network comprising a pair of side limbs and a plurality of cross limbs interconnecting said side limbs and spaced apart along said side limbs, an input winding linked with one end of the network, an output winding linked with the further end of the network, control windings on at least some of the intermediate limbs which when energised by control signals block the magnetic paths through said intermediate limbs and a single reset winding for the entire laddic, said reset winding being located solely between the output winding and the nearest cross limb carrying a control winding.

2. A laddic magnetic device as set forth in claim 1 in which short circuited conductors in separate circuits from said control windings encircle the cross limbs carrying said control windings.

References Cited

UNITED STATES PATENTS 2,963,591  12/1960  Crowley et al. _____ 340—174

BERNARD KONICK, *Primary Examiner.*

JAMES W. MOFFITT, *Examiner.*

P. SPERBER, *Assistant Examiner.*